Sept. 23, 1947. W. J. RADY ET AL 2,427,809
SYSTEM OF GENERATOR REGULATION
Filed Dec. 9, 1944
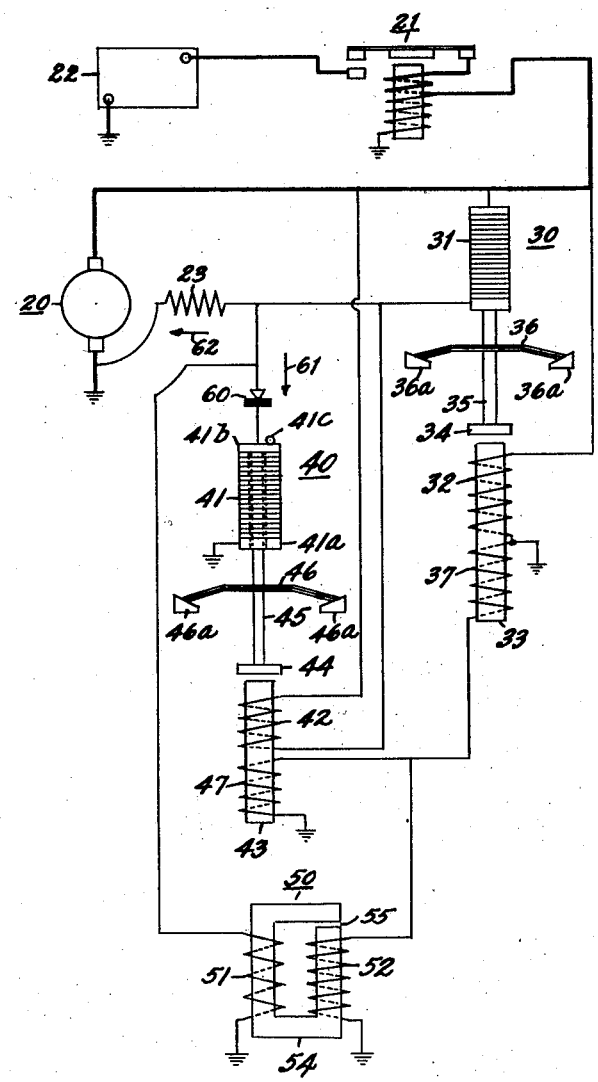
INVENTORS
William J. Rady and Lyman A. Rice
BY
Spencer, Hardman & Fehr
their ATTORNEYS Patented Sept. 23, 1947

2,427,809

UNITED STATES PATENT OFFICE 2,427,809

SYSTEM OF GENERATOR REGULATION

William J. Rady and Lyman A. Rice, Anderson, Ind., assignors to General Motors Corporation, Detroit, Mich., a corporation of Delaware Application December 9, 1944, Serial No. 567,422

4 Claims. (Cl. 171—229)

This invention relates to carbon-pile voltage regulation for a variable speed generator. As the speed of the generator varies, there is considerable variation in the field current controlling resistance of the carbon-pile required to control high field current at low speed and low field current at high speed. Since there is a limit to which the carbon-pile resistance can be varied by an electromagnet responsive to generator voltage, the use of a carbon-pile regulator has been limited.

An object of the present invention is to make possible the use of a carbon-pile regulator to control the voltage of a generator whose speed varies between very wide limits. This object is accomplished by the provision of a variable resistance by-pass around the generator field and means for controlling the by-pass in a manner such that, at low speed when the field current is high, the by-pass will have high resistance, and that, at high speed when the field current is low, the by-pass will have relatively low resistance. The result is that, throughout a wide range of generator speed, the variation in current flowing through the carbon-pile of the voltage regulator is much less than the variation in the current flowing through the generator field. According to the present invention the by-pass resistance is under control by a magnet coil responsive to voltage drop across the field controlling carbon-pile.

A further object is to minimize hunting in the system when there is a sudden increase in generator speed by providing a circuit for dampening the effect of a sudden decrease in field current.

Further objects and advantages of the present invention will be apparent from the following description, reference being had to the accompanying drawing, wherein a preferred form of embodiment of the present invention is clearly shown.

The figure of the drawing is a wiring diagram showing an embodiment of the invention.

Referring to the drawing, a generator 20 is connected by a relay 21 with a storage battery 22. When the generator 20 obtains a voltage sufficient to charge the battery, relay 21 closes; and relay 21 opens when generator voltage falls a predetermined amount below battery voltage.

The generator 20 has a shunt field 23 in series with the carbon-pile 31 of a regulator 30 which comprises a coil 32 responsive to generator voltage and surrounding a core 33 cooperating with an armature 34 attached to a rod 35 with which a laminated leaf spring 36 is connected. Spring 36 is normally biased upwardly so as to exert a predetermined pressure upon the discs of the carbon-pile 31. Spring 36 so cooperates the abutments 36a that the force of the spring 36 increases in proportion to the increase of magnetic pull as the air gap between the armature 34 and the core 33 decreases.

The instrument 40 includes a carbon-pile 41 shunting the field 23. As the pile 41 provides a by-pass around the field 23, the instrument 40 may be called a by-pass controller. The controller 40 has a coil 42 responsive to voltage drop across the carbon-pile 31 and surrounding a core 43 cooperating with an armature 44 attached to a rod 45 which extends from the armature 44 upwardly through the fixed terminal 41a of the pile and the washer-like discs of the pile 41 and which is attached to the movable terminal 41b. A spring 46 is attached to the rod 45 and bears against abutments 46a. The force of the spring 46 increases in proportion to the magnetic pull as the gap between the armature 44 and the core 43 decreases. Spring 46 normally locates the terminal 41b against a stop 41c. The pile 41 is normally practically open-circuited.

The operation of the regulating system will now be described with reference to a particular generator which may be, for example, one having a working voltage of 28 volts for charging a 24 volt battery and having a low resistance field, for example, 4 ohms. At cut-in speed, when the relay 21 closes, the field current is 7 amps. At high speed the required field current may be as low as ¼ amp.

Therefore the voltage drop in the field 23 would be 1 volt. The voltage drop in the carbon-pile 31 would be 28 volts minus 1 volt or 27 volts. If the by-pass pile 41 is not used, the resistance of the pile 31 must be 27÷¼=108 ohms. Therefore, over the speed range of the generator, the resistance of pile 31 must change from practically zero ohms to 108 ohms.

In order to decrease the variation in resistance of pile 31, some current is by-passed by the pile 41. For example, if the instrument 40 were so constructed that 27 volts impressed on coil 42 causes the resistance of pile 41 to become 1 ohm, 1 amp. current will pass through it; and the total current in pile 31 would be ¼ amp. field current plus 1 amp. or 1¼ amps. The resistance of pile 31 would be 27÷1¼=21.6 ohms. If the instrument 40 were so constructed that 27 volts impressed on coil 42 causes the resistance of pile 41 to become ½ ohms, 2 amps. current will pass through it; and the total current in pile 31 would be ¼ amp. field current plus 2 amps. or 2¼ amps. The resistance of the pile 31 would be 27÷2¼=12 ohms.

When instrument 40 is not used as speed increases from cut-in speed to maximum speed, the current in the field 23 decreases from 7 amps. to ¼ or 1/28 of the value at cut-in speed. When instrument 40 is used, according to the first example the current in pile 31 decreases from 7 amps, to 1¼ or 1/5.6 of the value at cut-in speed; and, according to the second example, the current in pile 31 decreases from 7 amps. to 2.225 amps. or 1/3.11 of the value at cut-in speed. Since the by-pass 41 is effective to confine the variation of field regulating resistance to relatively narrow range, it is possible to use a carbon-pile regulator for the regulation of a generator having a wide range of operating speed.

The present system is particularly adapted for the control of a generator having a low resistance field because there will be a relatively great variation in voltage drop in the pile 31 and, consequently a relatively great variation in the voltage reduction in the resistance of the by-pass pile 41.

In order to prevent hunting in the system due to sudden increase in generator speed, the instruments 30 and 40 are provided, respectively, with dampening coils 37 and 47 connected in a parallel circuit which is in series with the secondary 52 of a transformer 50 whose core 54 has a small air gap 55 so that the core will not be saturated by direct current which flows through the transformer primary 51 connected in parallel with the generator field 23. A rectifier or one-way electrical valve 60, passing current only in the direction of arrow 61, is in the circuit between the piles 31, and the pile 41.

When there is a sudden increase in the speed of the generator, the tendency is to make an over-correction of field current with the result that there would be a considerable fluctuating of voltage, of "hunting," before stability is attained. When the speed increases suddenly, coil 32 operates immediately to increase the resistance of pile 31 and the field current will decrease abruptly. Because field current tends to continue to flow in the same direction, a voltage is induced in the direction of arrow 62. This induced voltage cannot force current through pile 41 because such flow is blocked by rectifier 60; therefore, this voltage will force current only through transformer primary 51. Coil 37 of instrument 30 is so wound that it opposes the tendency of coil 32 to over-increase the resistance of pile 31. Coil 47 of instrument 40 is so wound that it opposes the effect of the voltage surge in coil 42 when the voltage drop across the pile 31 tends to increase when the resistance of the pile 31 increases. Therefore the tendency to over-correct is dampened and the fluctuations in voltage vanish rapidly.

In the two examples given heretofore, direct current flowing in coil 51 of the transformer 50 was disregarded. Obviously, the resistance of coil 51 would be high as compared with the low resistance of field 23; and the results shown by the example would not be materially affected.

While the embodiment of the present invention as herein disclosed, constitutes a preferred form, it is to be understood that other forms might be adopted, all coming within the scope of the claims which follow.

What is claimed is as follows:

1. A system of regulation for a variable speed generator comprising a field regulator having a carbon pile in series with the generator field, a spring urging the pile into low resistance status and an electromagnet responsive to generator voltage for opposing the spring, and a field by-pass controller having a normally high resistance in parallel with the generator field and an electromaget responsive to voltage drop across the carbon-pile of the regulator for decreasing the by-pass resistance.

2. A system of regulation for a variable speed generator comprising a field regulator having a carbon pile in series with the generator field, a spring urging the pile into low resistance status and an electromagnet responsive to generator voltage for opposing the spring, and a field by-pass controller having a carbon pile in parallel with the generator field, a spring for urging the pile into practically open-circuit status and an electromagnet responsive to voltage drop across the carbon-pile of the regulator for opposing the spring of the by-pass controller and thereby operating to decrease the resistance of the second mentioned carbon pile.

3. A system of regulation for a variable speed generator comprising a field regulator having a variable resistance in series with the generator field and an electromagnet responsive to generator voltage for controlling the resistance, a field by-pass controller having a normally high resistance in parallel with the generator field and an electromagnet responsive to voltage drop across the regulator resistance for decreasing the by-pass resistance, and means for dampening hunting when there is an abrupt change in conditions causing a voltage surge in the generator field, said means comprising a transformer having a primary in parallel with the generator field and a secondary, dampening coils magnetically related to the electromagnets of the regulator and by-pass controller and connected with the transformer secondary, and a rectifier in the connection between the by-pass resistance and the junction of the transformer primary with the generator field for blocking the passage of current through the by-pass resistance due to voltage surge in the field.

4. A system of regulation for a variable speed generator comprising a field regulator having a carbon pile in series with the generator field, a spring urging the pile into low resistance status and an electromagnet responsive to generator voltage for opposing the spring, and a field by-pass controller having a carbon pile in parallel with the generator field, a spring for urging the pile into practically open circuit status and an electromagnet responsive to voltage drop across the carbon pile of the regulator for opposing the spring of the by-pass controller and thereby operating to decrease the resistance of the second mentioned carbon pile, and means for dampening hunting when there is an abrupt change in conditions causing a voltage surge in the generator field, said means comprising a transformer having a primary in parallel with the generator field and a secondary, dampening coils magnetically related to the electromagnets of the regulator and by-pass controller and connected with the transformer secondary, and a rectifier in the connection between the by-pass resistance and the junction of the transformer primary with the generator field for blocking the passage of current through the by-pass resistance due to voltage surge in the field.

WILLIAM J. RADY.
LYMAN A. RICE.

REFERENCES CITED

The following references are of record in the file of this patent:

UNITED STATES PATENTS

| Number | Name | Date |
|---|---|---|
| 1,251,708 | Turbayne | Jan. 1, 1918 |
| 1,314,166 | Turbayne | Aug. 26, 1919 |
| 1,502,374 | Creveling | July 22, 1924 |
| 1,933,858 | Keller | Nov. 7, 1933 |
| 2,221,587 | Kovalsky | Nov. 12, 1940 |